United States Patent
Alda et al.

(10) Patent No.: US 11,983,652 B2
(45) Date of Patent: May 14, 2024

(54) IDENTIFICATION OF FEATURES FOR PREDICTION OF MISSING ATTRIBUTE VALUES

(71) Applicant: SAP SE, Walldorf (DE)

(72) Inventors: Francesco Alda, Wiesloch (DE); Amrit Raj, Berlin (DE); Sergey Smirnov, Heidelberg (DE); Evgeny Arnautov, Stutensee (DE)

(73) Assignee: SAP SE, Walldorf (DE)

( * ) Notice: Subject to any disclaimer, the term of this patent is extended or adjusted under 35 U.S.C. 154(b) by 158 days.

(21) Appl. No.: 17/316,058

(22) Filed: May 10, 2021

(65) Prior Publication Data
US 2022/0358432 A1    Nov. 10, 2022

(51) Int. Cl.
*G06Q 10/00*    (2023.01)
*G06N 5/022*    (2023.01)
*G06Q 10/0631*    (2023.01)

(52) U.S. Cl.
CPC ....... *G06Q 10/06313* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 10,402,726 B1* | 9/2019 | Moore | G06N 7/01 |
| 11,188,845 B2* | 11/2021 | Belyaev | G06T 11/206 |
| 11,478,190 B2* | 10/2022 | Mulligan | G16H 40/67 |
| 2002/0103695 A1* | 8/2002 | Urken | G06Q 30/02 705/12 |
| 2002/0127529 A1* | 9/2002 | Cassuto | G09B 5/02 434/335 |
| 2006/0161403 A1* | 7/2006 | Jiang | G06N 20/00 703/2 |

(Continued)

OTHER PUBLICATIONS

"Random forests—An ensemble of decision trees,"This is how decision trees are combined to make a random forest, Rukshan Pramoditha, Oct. 29, 2020 (Year: 2020).*

(Continued)

*Primary Examiner* — Hafiz A Kassim
*Assistant Examiner* — Scott M Ross
(74) *Attorney, Agent, or Firm* — Klarquist Sparkman, LLP

(57) ABSTRACT

Technologies are described for identifying features that can be used to predict missing attribute values. For example, a set of structured data can be received comprising a plurality of features and one or more labels. The set of structured data can be pre-processed, comprise applying one or more cleaning policies to produce a set of pre-processed features. The set of pre-processed features can be filtered using correlation-based filtering that uses one or more correlation estimation techniques to remove at least some highly correlated features. The correlation-based filtering can produce a set of filtered features. Feature subset selection can be performed comprising applying machine learning algorithms to the set of filtered features to determine relative importance among the set of filtered features. Based on the relative importance, a subset of the set of filtered features can be determined. The subset of the set of filtered features can be output.

20 Claims, 4 Drawing Sheets

(56) References Cited

U.S. PATENT DOCUMENTS

| | | | | |
|---|---|---|---|---|
| 2006/0277005 | A1* | 12/2006 | Walker | G06F 30/00 |
| | | | | 703/1 |
| 2011/0106735 | A1* | 5/2011 | Weston | G06N 20/00 |
| | | | | 706/12 |
| 2013/0080438 | A1* | 3/2013 | Tompkins | G06Q 30/0282 |
| | | | | 707/740 |
| 2014/0188564 | A1* | 7/2014 | Ghatti | G06Q 30/0204 |
| | | | | 705/7.33 |
| 2014/0236965 | A1* | 8/2014 | Yarmus | G06F 16/22 |
| | | | | 707/748 |
| 2015/0088907 | A1* | 3/2015 | Li | G16H 10/60 |
| | | | | 707/749 |
| 2015/0378975 | A1* | 12/2015 | Wu | G06Q 30/06 |
| | | | | 715/226 |
| 2017/0185668 | A1* | 6/2017 | Convertino | G06F 40/18 |
| 2019/0188531 | A1* | 6/2019 | Ozcaglar | G06F 18/211 |
| 2019/0294962 | A1* | 9/2019 | Vezer | G06N 7/01 |
| 2019/0303471 | A1* | 10/2019 | Lee | G06F 16/2365 |
| 2019/0303774 | A1* | 10/2019 | Shah | G06N 5/04 |
| 2020/0410041 | A1* | 12/2020 | Singapurwala | G06F 16/221 |
| 2021/0390097 | A1* | 12/2021 | Rout | G06N 3/08 |
| 2022/0019936 | A1* | 1/2022 | Sarda | G06N 20/00 |
| 2022/0083519 | A1* | 3/2022 | Xu | G16H 50/20 |
| 2022/0083918 | A1* | 3/2022 | Wang | G06N 20/00 |
| 2022/0292239 | A1* | 9/2022 | Kahraman | G06N 20/00 |
| 2022/0351087 | A1* | 11/2022 | Zheng | G06N 20/00 |
| 2022/0358432 | A1* | 11/2022 | Alda | G06Q 10/06313 |
| 2023/0281203 | A1* | 9/2023 | Ko | G06F 16/24568 |
| | | | | 707/754 |
| 2023/0288885 | A1* | 9/2023 | Herring, III | D21F 7/00 |
| | | | | 700/47 |

OTHER PUBLICATIONS

"Machine Learning Mastery: Why Use Ensemble Learning," Jason Brownlee, Apr. 27, 2021; (Year: 2021).*

Birthday Data Type: Sales/Person Accounts, Idea Exchange, Darren Kowitt, Dec. 21, 2018 (Year: 2018).*

Regression with Highly Correlated Predictors: Variable Omission Is Not the Solution Gregorich M., Strohmaier S., Dunkler D. & Heinze G. (2021). Int. J. Environ. Res. Public Health, 18: 4259. (Year: 2021).*

* cited by examiner

SOFTWARE 480 IMPLEMENTING DESCRIBED TECHNOLOGIES

IDENTIFICATION OF FEATURES FOR PREDICTION OF MISSING ATTRIBUTE VALUES

BACKGROUND

The vision of an intelligent enterprise implies that users are relieved from routine tasks and can instead spend their time on business-critical decisions. Such enablement assumes that enterprise applications support users with suggestions or even fully automated routine procedures. Many scenarios in an intelligent enterprise require the capability to predict missing attribute values of a business object based on some known attribute values.

In an example scenario, a large international manufacturer maintains a catalogue of its products as master data. The person responsible for this task is a data steward. When a new product is introduced, the data steward creates a new record for this product in the master data. Typically, master data records for products have tens of attributes, which turns the product record creation task into a complex routine. However, often it is not necessary to provide all the product attribute values, because the values of some attributes depend on the values of other attributes. For instance, knowing the production plant, it is possible to predict the class of products that are manufactured in the plant. Hence, the product class can be deduced from the plant. As another example, the product tax class can be inferred from the product description, size, and weight. The values of these attributes can be used to determine the type of good and consequently the tax class which the product should be assigned to.

While attribute values can in some cases be predicted from the values of other attributes, performing such prediction can be a time consuming and computationally expensive task. For example, it may be difficult to determine which attributes can be used to predict the missing values for other attributes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for identifying features that can be used to predict missing attribute values. For example, a set of structured data can be received comprising a plurality of features and one or more labels. The set of structured data can be pre-processed, which can comprise applying one or more cleaning policies to produce a set of pre-processed features. The set of pre-processed features can be filtered using correlation-based filtering. The correlation-based filtering can apply one or more correlation estimation techniques to remove at least some highly correlated features. The correlation-based filtering can produce a set of filtered features. Feature subset selection can be performed comprising applying machine learning algorithms to the set of filtered features to determine relative importance among the set of filtered features. Based on the relative importance, a subset of the set of filtered features can be determined. The subset of the set of filtered features can be output.

DETAILED DESCRIPTION

Overview

Figure 1:
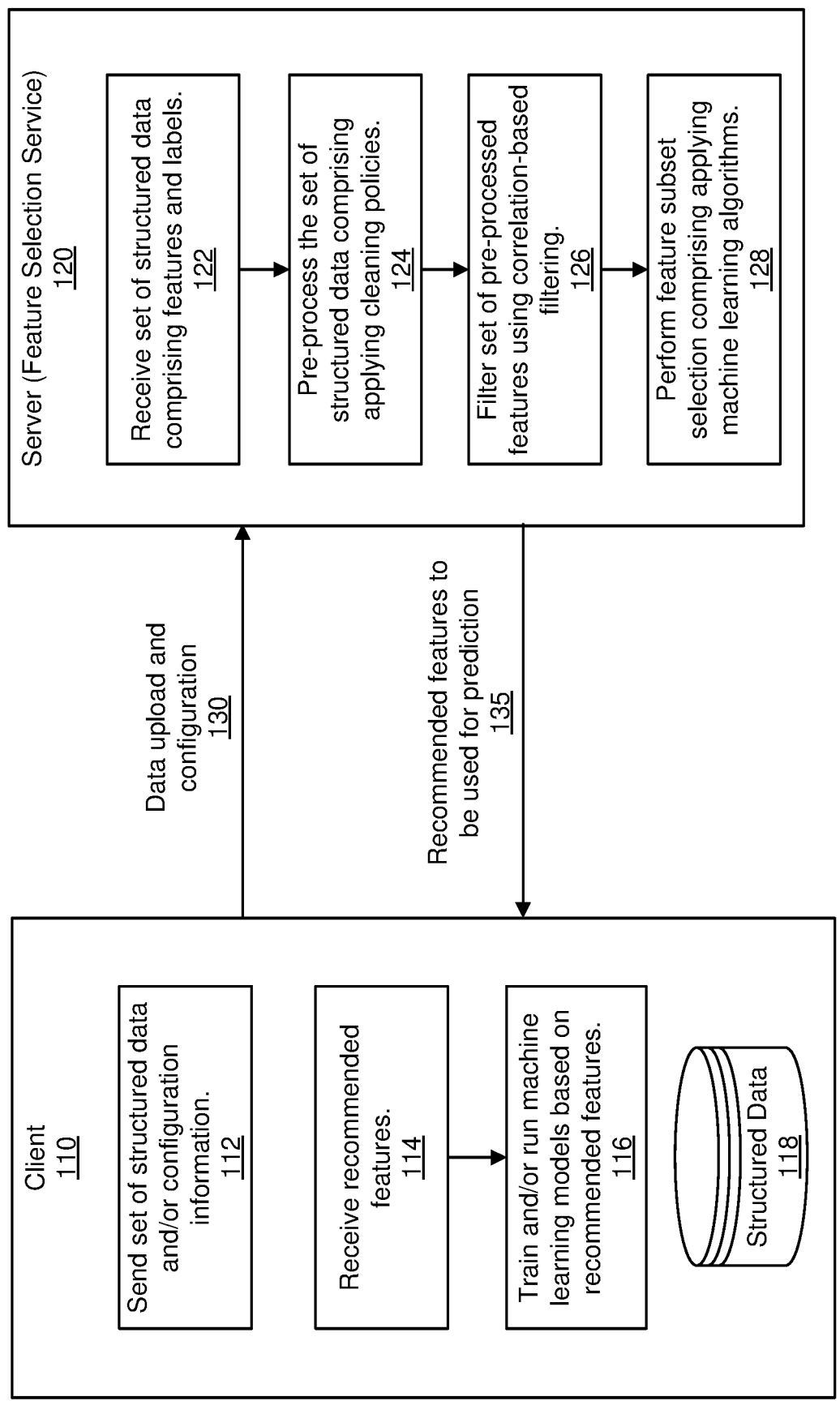
FIG. 1 is a diagram depicting an example environment for automated selection of features for predicting missing attribute values.

The following description is directed to technologies for identifying features that can be used to predict missing attribute values. For example, a set of structured data can be received comprising a plurality of features (e.g., identified by feature name, feature data type, feature value, etc.) and one or more labels. The set of structured data can be pre-processed, which can comprise applying one or more cleaning policies to produce a set of pre-processed features. The set of pre-processed features can be filtered using correlation-based filtering. The correlation-based filtering can apply one or more correlation estimation techniques to remove at least some highly correlated features. The correlation-based filtering can produce a set of filtered features. Feature subset selection can be performed comprising applying machine learning algorithms to the set of filtered features to determine relative importance among the set of filtered features. Based on the relative importance, a subset of the set of filtered features can be determined. The subset of the set of filtered features can be output. The subset of the set of filtered features can be used as recommended features to predict missing values of the one or more labels.

Maintenance of data sets (e.g., master data) can be difficult for an organization. In addition, the difficulty of managing data increases with the size of the data set (e.g., the number that are maintained, such as the number of products, customers, etc.). In typical scenarios, checking and correcting data sets is a manual activity performed by people. Due to the amount of data that is often used within an organization, performing such manual checking and correction can be time consuming and error prone, and in many cases, it can be impractical to perform manual review of such data sets.

The feature identification technologies described herein can be applied to automatically identify (e.g., recommend) features that can be used to predict missing attribute values in a data set (e.g., in master data). For example, a user can provide a set of structured data comprising a number of features and identifying attributes with missing values. An automated procedure can be performed to automatically identify which of the features are best able to predict the missing values of the labels. The identified features can then be used in a prediction scenario (e.g., to train a machine learning model to predict the missing values based on the identified features).

Features and Labels

The technologies described herein can be used during automated selection of features that are later used to predict values for attributes.

As used herein, the term "feature" means an attribute with a known value. In the context of machine learning, a "feature" is an attribute with a known value that is used as an input for prediction.

In the context of machine learning, the attributes whose values (e.g., missing values) are predicted are called "labels." For example, given a set of examples (input-output pairs), a supervised machine learning model can be used to identify the features that are good predictors of the values of the labels.

Features can be present in many types of data, such as master data. For example, a data set (e.g., database table) containing product data for an organization contains a number of features. There could be a product name feature, a regular price feature, a sale price feature, a description feature, and so on.

In some implementations, the features are features of master data. The term master data refers to data describing stable entities. In other words, master data is data defining the entities or objects that give context to activities performed by an organization. Typically, master data does not change frequently. Examples of master data include, but are not limited to, data representing products, customers, vendors, costs, assets, etc.

Cleaning Policies

In the technologies described herein, cleaning policies can be applied to data to clean the data. In some implementations, cleaning policies are applied in a pre-processing stage of a process that determines recommended features for predicting attributes with missing values.

In general, a cleaning policy represents a syntactical description of a transformation to apply to the data. For example, a cleaning policy can be applied to transform text data into all lower case, to remove certain punctuation or special characters, to keep only upper or lower case words, etc. A cleaning policy can comprise a set of rules or functions for transforming the data.

In some implementations, a plurality of cleaning policies are applied to the data (e.g., to a set of structured data, such as data from a database table). The plurality of cleaning policies can be applied as a pre-processing stage for filtering features of the data. The plurality of cleaning policies can comprise cleaning policies that are specific to the type of data (e.g., the feature data type) being cleaned. In other words, one or more cleaning policies can be specific to a first type of data, one or more other cleaning policies can be specific to a second type of data (different from the first type of data), and so on. For example, a first cleaning policy can be applied to transform textual features (e.g., attribute values that have a feature type of textual). A second cleaning policy can be applied to numerical features (e.g., attribute values that have a feature type of numerical). One example cleaning policy is a cleaning policy that is applied to textual features and that performs various transformations on the text data, such as transforming the text to all lower case, removing punctuation, removing extra spaces, and/or performing other text transformations. Another example cleaning policy is a cleaning policy that is applied to date and/or time data (e.g., to normal time zones). Another example cleaning policy is a cleaning policy that is applied to price data (e.g., to translate prices into a common currency). Another example cleaning policy is a cleaning policy that is applied to Taric codes (e.g., to enforce a specific data format, such as a fixed 8-digit length, and to edit the codes if needed).

In some implementations, a specific cleaning policy is selected based on a domain of the data set being cleaned (e.g., using domain knowledge). For example, when processing Taric codes, the cleaning policy can enforce a specific data format for the Taric codes (e.g., a fixed-length 8 or 10 digit format).

The result of applying the cleaning policies to the data set (e.g., to an input set of structured data) is a set of pre-processed features. The set of pre-processed features can be used for later processing (e.g., for a feature filtering stage and/or a feature subset selection stage).

Correlation-Based Filtering of Features

In the technologies described herein, correlation-based filtering can be applied to filter out some features while retaining other features. In some implementations, filtering is applied to the pre-processed features (e.g., to the data set after it has been pre-processed using one or more cleaning policies) as a filtering stage of a process that determines recommended features for predicting attributes with missing values.

Correlation-based filtering involves determining feature correlation between the features. Specifically, statistical measures are used to determine the correlation of features across the different data types present in the data set. In some implementations, the feature correlation is determined by calculating pairwise correlation measures between pairs of features (e.g., between each pair of features). The correlation estimation techniques that are applied can include Jaccard similarity, Pearson correlation, and/or other techniques to estimate correlation between features (e.g., other correlation coefficient functions). In some implementations, the statistical measures are normalized to a value between zero and one, but other ranges could be used (e.g., zero to 100).

Features that have a low correlation measure are retained for the next stage. If features are highly correlated, one of them will be filtered out (dropped) and not included in the next stage. When features are highly correlated, one of them can be filtered out because both features are equal, or nearly equal, in their ability to predict attributes with missing values in later machine learning. In addition, filtering out highly correlated features provides advantages in terms of computing resources. For example, by outputting a set of filtered features (only a subset of the input pre-processed features), later processing (e.g., machine learning to predict attributes with missing values) can be performed using fewer computing resources, including fewer memory resources, reduced storage resources, and less processor resources. In addition, because the process of filtering features is relatively cheap (in terms of computing resource utilization) compared to the process of training a machine learning model, reducing the number of features used in training the machine learning model provides even more benefits in terms of reducing the amount of computing resources used.

In some implementations, an iterative process is used to determine the pairwise correlation measures for the pairs of features and determine which to filter out if they are highly correlated. In the iterative process, a first pair of features is chosen (e.g., the first two features in the data set) and their pairwise correlation measure is calculated. If the first pair of features is highly correlated (e.g., having a correlation measure above a threshold), then one of them is filtered out and the other is retained. Then, a second pair of features is chosen and their pairwise correlation measure is calculated. If the second pair of features is highly correlated (e.g., having a correlation measure above the threshold), then one of them is filtered out and the other is retained. The iterative process continues until all pairs of features have been compared (e.g., all permutations of pairs of features in the data set). In some implementations, the iterative process can consider only a portion of the features, such as a random subset (e.g., to improve efficiency of the iterative process).

In some implementations, the iterative process is performed by category of features (e.g., based on feature type), also referred to as feature type groupings. For example, the iterative process can be performed for a first category (a first feature type grouping) that contains the text-based features (e.g., feature types of textual, categorical, Boolean, etc.), and for a second category (a second feature type grouping) that contains the numerical-based features (e.g., feature types of numerical, float, etc.). The iterative process can be performed for other and/or additional categories as well (e.g., time or date categories).

In some implementations, the correlation measures are compared to a threshold. For example, the correlation measure (in particular, the value of the correlation measure) for each pair of features can be compared to a threshold. If a given correlation measure is above the threshold (e.g., of the correlation measure's value is 0.96 and the threshold is 0.90), then one of the features is filtered out (i.e., not included in the set of filtered features) while the other feature is retained. Different methods can be used to determine which feature is filtered out, and which is retained, when a given correlation measure is above the threshold. In some implementations, the feature that is more populated is retained (e.g., the feature which has more populated values in its column is retained). For example, if the two features are "regular price" and "sale price," and they are found to be highly correlated (e.g., over the threshold value), then one of them can be filtered out. If the "sale price" feature is less populated (e.g., many of the products may not have a sale price value) than the "regular price" feature, then the "sale price" feature can be filtered out while the "regular price" feature can be retained. Other techniques can also be applied to determine which feature to filter out. For example, one of the features can be selected randomly.

In some implementations, the threshold is a pre-determined threshold. For example, the threshold can be set to 0.80 (e.g., as a default setting). In some implementations, the setting can be adjusted by the user. For example, the user may be able to provide their own threshold (e.g., 0.95) or adjust a pre-determined threshold.

In some implementations, the filtering of the features also involves a manual selection process. During the manual process selection, the user can select one or more features to keep, even if such features would be filtered out as being highly correlated. For example, the user can view results of an automated filtering process with indications of which features are being retained and which features are being filtered out. The user could then select one or more of the features that are being filtered out and instead have those features retained.

The result of applying the correlation-based filtering to the set of pre-processed features is a set of filtered features. The set of filtered features represents the features that are retained after the filtering is performed (i.e., after at least some of the highly correlated features have been filtered out).

Feature Subset Selection

In the technologies described herein, feature subset selection can be applied (e.g., as a feature subset selection stage) to further reduce the number of features by selecting a subset of the set of filtered features. Feature subset selection is performed by estimating feature importance among the set of filtered features using one or more supervised machine learning algorithms (e.g., using one or more trained machine learning models). Features with high feature importance are retained while features with low feature importance are filtered out. For example, a feature subset selection stage can be performed as part of a process that determines recommended features for predicting attributes with missing values.

Various machine learning algorithms can be applied when performing feature subset selection. For example, machine learning algorithms such as extra-trees classifier, random forest, linear classifier, and/or other machine learning algorithms or techniques can be applied to determine relative importance among the features.

To determine feature importance of a given feature, a feature importance value (e.g., a numerical value between zero and one) is determined for the given feature using one or more machine learning models. The feature importance value for a given feature represents how important the given feature is in predicting the values of the target labels (the attributes with the missing values).

In some implementations, a model agnostic approach is used to determine feature importance. With the model agnostic approach, the features are selected independent of the machine learning model(s) that will ultimately be used to predict the target labels. In some implementations, a model dependent approach is used to determine feature importance. With the model dependent approach, the features are selected, at least in part, based on the machine learning model(s) that will ultimately be used to predict the target labels. For example, if the machine learning model that will ultimately be used is a specific multi-layer neural network, the relative feature importance can be computed with a permutation feature importance measure specific to this model. The relative importance of a given feature can then be estimated from the selected model's prediction error after randomly permuting the given feature.

Once the feature importance values have been determined, a subset of the set of filtered features is selected based on the feature importance values. In some implementations, features with feature importance values above a threshold value are retained, while those at or below the threshold value (e.g., a threshold value of 0.6) are filtered out. The threshold value can be a pre-defined value and/or a user-configurable value. In some implementations, the features are ordered by their feature importance values and the highest N features are retained (e.g., N can be a pre-defined and/or user-configurable number).

In some implementations, the feature importance is determined using a machine learning algorithm that is less computationally expensive than the ultimate machine learning algorithm (e.g., a neural network algorithm) that will be used to predict attributes with missing values. In other words, a less expensive machine learning algorithm (e.g., a machine learning model based on extra-trees classifier, random forest, or linear classifier techniques) can be applied in the feature subset selection stage to filter out features that are less important in determining target labels, and then the retained features (the subset with high feature importance) can be used when training and running a more computationally expensive machine learning model (e.g., that uses a multi-layer neural network).

In some implementations, the feature subset selection stage also involves a manual selection process. During the manual process selection, the user can select one or more features to keep, even if such features would be filtered out as having low feature importance or as not being within the top N number of features. For example, the user can view results of an automated feature subset selection process with indications of which features are being retained and which features are being filtered out. The user could then select one or more of the features that are being filtered out and instead have those features retained.

Example Environments for Automated Selection of Features to be Used for Predicting Missing Attribute Values In the technologies described herein, environments can be provided for performing automated selection of features to be used for future prediction of attributes with missing values (labels). The environments can include computing resources (e.g., computing devices such as desktops, servers, etc., database resources, cloud computing resources, and/or other types of computing resources).

FIG. 1 is a diagram depicting an example environment 100 for automated selection of features for predicting missing attribute values. The example environment 100 depicts a client 110. The client 110 can be any type of computing hardware and/or software that is configured (e.g., running computer-executable instructions) to perform operations implementing the technologies described herein. The client 110 can run on various types of computing resources (e.g., a server computer, desktop computer, laptop computer, smart phone, virtual computer, or another type of computing device).

The example environment 100 depicts a server 120. The server 120 can be any type of computing hardware and/or software that is configured (e.g., running computer-executable instructions) to perform operations implementing the technologies described herein. The server 120 can be implemented using various types of computing resources (e.g., server resources, database resources, storage resources, cloud computing resources, etc.).

In the example environment 100, the client 110 provides a local environment for managing data (e.g., structured data 118, which could be a database or another type of data store). For example, a database administrator or other user can use a computer user interface to perform at least some of the depicted operations. At 112, the client 110 sends a set of structured data (e.g., one or more tables, or portions of tables, from the structured data 118) to the server 120, as depicted at 130. For example, a user of the client 110 could use a computer user interface to select the set of structured data (e.g., select one or more features and/or labels from one or more database tables) for sending to the server 120. The client 110 can also send other information to the server 120, such as configuration information, as depicted at 130. The set of structured data can include information indicating the target labels (the attributes to be predicted). The client 110 can also send indications of machine learning algorithms or models to use in evaluating the features (e.g., as part of the configuration information).

At 122, the server 120 receives the set of structured data from the client 110. The set of structured data comprises a plurality of features (e.g., identified by at least feature name, feature data type, and feature value) and one or more labels (which includes their associated values). The server 120 can also receive other information (e.g., configuration information) from the client 110.

At 124, the server 120 pre-processes the set of structured data, which comprises applying one or more cleaning policies. In some implementations, different cleaning policies are applied to different data types (e.g., different data types of the features and/or labels). The pre-processing produces a set of pre-processed features.

At 126, the server 120 filters the set of pre-processed features using correlation-based filtering. The correlation-based filtering applies one or more correlation estimation techniques to the set of pre-processed features to remove at least some highly correlated features and produce a set of filtered features.

At 128, feature subset selection is performed, which comprises applying machine learning algorithms to the set of filtered features to determine relative importance values among the set of filtered features in relation to the labels. A subset of the set of filtered features is selected based at least in part on the determined relative importance values (e.g., the features with the N highest relative importance values or the features with relative importance values above a threshold value). At 135, the recommended features, which is the subset of the set of filtered features resulting from the operation performed at 128, are returned to the client 110, as depicted at 135.

At 114, the client 110 receives the recommended features. At 116, the client 110 can use the recommended features for prediction of values of the labels (the attributes with missing values) by training and/or running machine learning models. Using the recommended features provides improvements in terms of speed and efficiency. For example, instead of using all of the features of a given data set (e.g., which may have tens, hundreds, or thousands of columns), only the recommended subset of features can be used (e.g., which could be a small fraction of the available features, such as only five or ten features) when training and/or running machine learning models to predict values of the labels.

In some implementations, the client 110 accesses the server 120 as a cloud service (e.g., as a feature selection service). For example, the client 110 can be in a remote location and access the cloud service via a computer network (e.g., via the Internet). In some implementations, the client 110 accesses the server 120 via an application programming interface (API) and/or via a web service.

The example environment 100 depicts an example client-server arrangement for implementing the technologies described herein. However, the technologies do not have to be performed using a client-server arrangement. For example, a single computing environment (e.g., a local collection of computing resources) could perform all of the operations (e.g., all operations could be performed at the client 110, which could be a database server)

In some implementations, the client 110 accesses the server 120 via a representational state transfer (RESTful) API. For example, the feature selection service running at the server 120 receives HTTP requests from the client 110 (e.g., from web applications running at the client 110) via the RESTful API. In some implementations, the features selection service provides the following functionalities: definition of data set schema, upload of data set, optional selection of machine learning models (e.g., predefined machine learning models) to use for evaluation, and determination of recommended features. When defining the data set, the user can specify the following: attributes to be evaluated, data types of the attributes, which attributes are features, and which attributes are labels. The user can upload the data set as a table of data (e.g., comprising the features to be evaluated as well as the features which will be used as labels).

In some implementations, the feature selection service (e.g., provided via an API, such as a RESTful API) is provided with full client control. This implementation involves the following operations:
1. Create a data set schema. The data set schema identifies the features and labels in the data set, the data types, etc. The service returns a unique id for the data set schema.
2. Create a data set using the data set schema id from (1). The service returns a unique id for the data set.
3. Upload data for the data set created in (2).
4. [Optional] Select a predefined model from service for evaluation. The service will return a list of models with their respective model ids for selection.
5. Request recommendation of features for the created data set. Service triggers the feature recommendation process (e.g., performs pre-processing, filtering, and feature subset selection, which can correspond to the operations depicted at 124-128 in FIG. 1). If model id is selected from (4) and provided as a parameter, the service performs evaluation using the specific model. Otherwise, a model agnostic algorithm is used. The service returns all features in the data set schema from (1) with the corresponding importance in the range 0-1. Features discarded during stages 2 and 3 (filtering and feature subset selection) are marked appropriately. The user receives the recommended features, as well as the features that were not recommended, and is able to review them and when deciding which features to use for subsequent prediction (e.g., the user can modify the recommend features using domain knowledge).

The feature selection service with full client control can be implemented using the following RESTful request methods:
1. POST dataschema
2. POST dataset
3. POST data
4. GET models
5. GET/datasets/{datasetId}/featureSelection In some implementations, the feature selection service (e.g., provided via an API, such as a RESTful API) is provided with automated selection. This implementation involves the following operations:
1. Create a data set schema. The service returns a unique id for the data set schema.
2. Create a data set using the data set schema id from (1). The service returns a unique id for this data set.
3. Upload data for the data set created in (2).
4. [Optional] Select a predefined model from service for evaluation. The service will return a list of models with their respective model id for selection.
5. Request recommendation of features for the created data set. The service triggers the feature recommendation process (e.g., performs pre-processing, filtering, and feature subset selection, which can correspond to the operations depicted at 124-128 in FIG. 1). If model id is selected from (4) and provided as a parameter, the service performs evaluation using the specific model. Otherwise, a model agnostic algorithm is used. The service returns recommended features in a data set schema format with or without the corresponding importance in the range 0-1. Features discarded during stages 2 and 3 (filtering and feature subset selection) are not included in the returned data set schema. The user receives the recommended features (in the format of a data set schema) in a fully automated way (e.g., the user does not have to review the recommended features). The recommended features can then be used for predicting missing attribute values.

The feature selection service with automated selection can be implemented using the following RESTful request methods:
1. POST dataschema
2. POST dataset
3. POST data
4. GET models
5. GET/datasets/{datasetId}/featureSelection Example Feature Selection Scenario In the technologies described herein, recommended features can be determined for use when predicting attributes with missing values (labels). An example scenario is described below in which a user wants to automatically receive a recommendation as to which features to use to predict one or more target labels. In the example scenario, the user has selected a set of structured data that will be provided for analysis. The set of structured data can be provided in the format of a database table or in another format. Table 1 below depicts an example set of structured data that the user can provide.

TABLE 1

Example features for a product record

|   | Feature name | Feature type | Feature value |
|---|---|---|---|
| 1 | Name of product | Textual | Camera-abc |
| 2 | Unique stock identifier | Categorical | 123456 |
| 3 | Regular price | Numerical | $ 500 |
| 4 | Sale price | Numerical | $ 400 |
| 5 | Type | Categorical | Mirrorless |
| 6 | Description | Textual | Digital camera (24 MP, 3 in LCD display) |
| 7 | Model number | Categorical | 1234789 |
| 8 | Manufacture date | Date | Jan. 1, 2020 |
| 9 | Available in stock | Boolean | True |
| 10 | Color | Categorical | Black |

Table 1 contains ten features along with their associated feature types (feature data types) and feature values. It should be understood that the set of structured data depicted in FIG. 1 is a simplified example because it only depicts ten features and one record (for the specific digital camera product). A typical set of structured data may have many more features (e.g., hundreds or more) and many more records (e.g., hundreds, thousands, or more).

Table 2 below lists labels (the target labels). The specific labels listed in Table 2 are attributes of the product record depicted in Table 1 that are to be predicted (e.g., the labels may have missing values in a database table of products). The labels depicted in Table 2 could be automatically determined (e.g., by automatically selecting the attributes that have missing values in a data set) or manually identified (e.g., the user could select the attributes to be used as labels). The labels are provided as part of the analysis request, which could be included in the set of structured data or provided separately. In a typical set of data (e.g., a database table of products) there would be labels that have missing values (e.g., the label values for some of the category and subcategory labels would be missing).

TABLE 2

| | Labels | | |
|---|---|---|---|
| | Label name | Label type | Label value |
| 1 | Category | Categorical | Cameras |
| 2 | Subcategory | Categorical | DSLR |

Table 3 below lists features that have been identified as important in predicting the labels. Specifically, the features in Table 3 are those features, from the available features of Table 1, that have been recommended for predicting the missing values of the labels of Table 2.

TABLE 3

| | Recommended features | |
|---|---|---|
| | Feature name | Feature type |
| 1 | Name of product | Textual |
| 2 | Regular price | Numerical |
| 3 | Type | Categorical |
| 4 | Description | Textual |
| 5 | Color | Categorical |

For example, a set of structured data (e.g., the data depicted in Table 1 and Table 2) can be provided to a feature selection service (e.g., to feature selection service running at server 120). The feature selection service can perform pre-processing, filtering, and feature subset selection (e.g., performing the operations depicted at 124-128) using the set of structured data to produce a subset of a set of filtered features. The feature selection service can then return recommended features (the subset of the set of filtered features) (e.g., as depicted in Table 3). The recommended features can be used to predict the attributes with missing values (e.g., using one or more other machine learning models). For example, in the context of the example scenario, if the five recommended features of Table 3 are received, then values for the category and subcategory attributes of Table 2 can be predicted using the five recommended features of Table 3 (e.g., instead of using all ten features of Table 1). For example, a machine learning model (e.g., a multi-layer neural network neural network) can be trained using the five recommended features of Table 3 and then run to predict the labels of Table 2. This approach can be significantly more efficient (e.g., in terms of time and computing resources used) than training the machine learning model using all ten features of Table 1.

Methods for Automated Selection of Features to be Used for Prediction of Attributes with Missing Values In the technologies described herein, methods can be provided for performing automated of selection of features to be used for future prediction of attributes with missing values (labels). For example, the methods can be implemented by a feature selection service (e.g., implemented by server 120).

Figure 2:
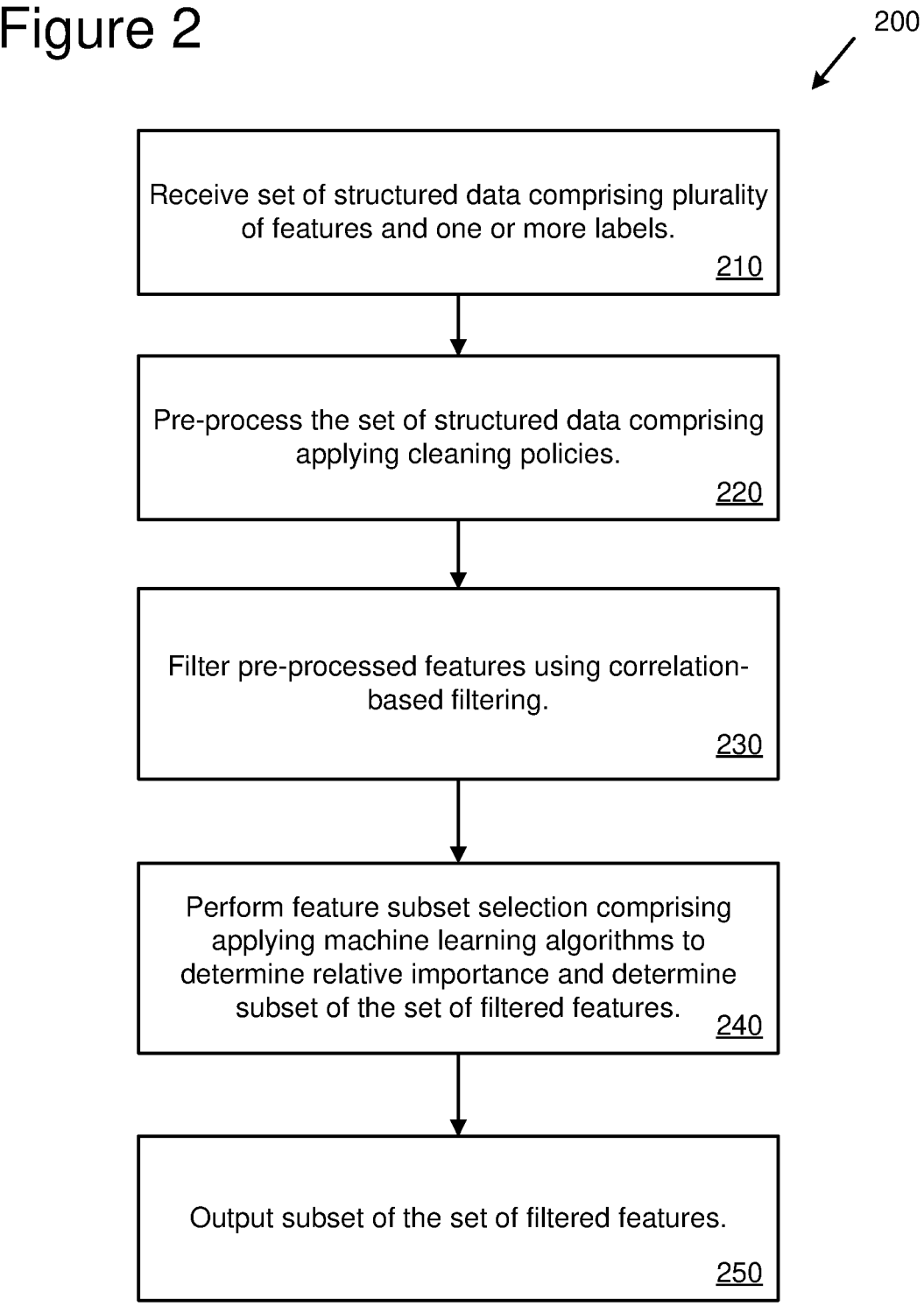
FIG. 2 is a is a flowchart of an example method for identifying features for predicting missing attribute values.

FIG. 2 is a flowchart depicting an example process 200 for identifying features for predicting missing attribute values. At 210, a set of structured data is received. The set of structured data comprises a plurality of features and one or more labels. The features and/or labels can be identified by name, data type, value and/or other attributes. In this context (when providing a set of structured data for identifying features), the set of structured data includes the features and labels, and their associated values (e.g., as depicted in Table 1 and Table 2).

At 220, the set of structured data is pre-processed, which comprises applying cleaning policies (e.g., a plurality of cleaning policies). Different cleaning policies can be applied to different feature data types (e.g., a given cleaning policy can be specific to one or more feature data types). The pre-processing produces a set of pre-processed features.

At 230, the pre-processed features are filtered using correlation-based filtering. The correlation-based filtering applies one or more correlation estimation techniques to the set of pre-processed features to remove at least some highly correlated features. The correlation-based filtering produces a set of filtered features (which does not contain the highly correlated features that have been removed).

At 240, feature subset selection is performed. Feature subset selection comprises applying one or more machine learning algorithms to determine relative importance among the set of filtered features and determine a subset of the set of filtered features. The relative importance is evaluated by determining relative importance values among the set of filtered features in relation to the one or more labels. The subset of the set of filtered features is then selected based at least in part on the determined relative importance values (e.g., only retaining the top N features with the highest relative importance values).

At 250, the subset of the set of filtered features is output. The subset of the set of filtered features are the recommended features for predicting missing values of the one or more labels.

Figure 3:
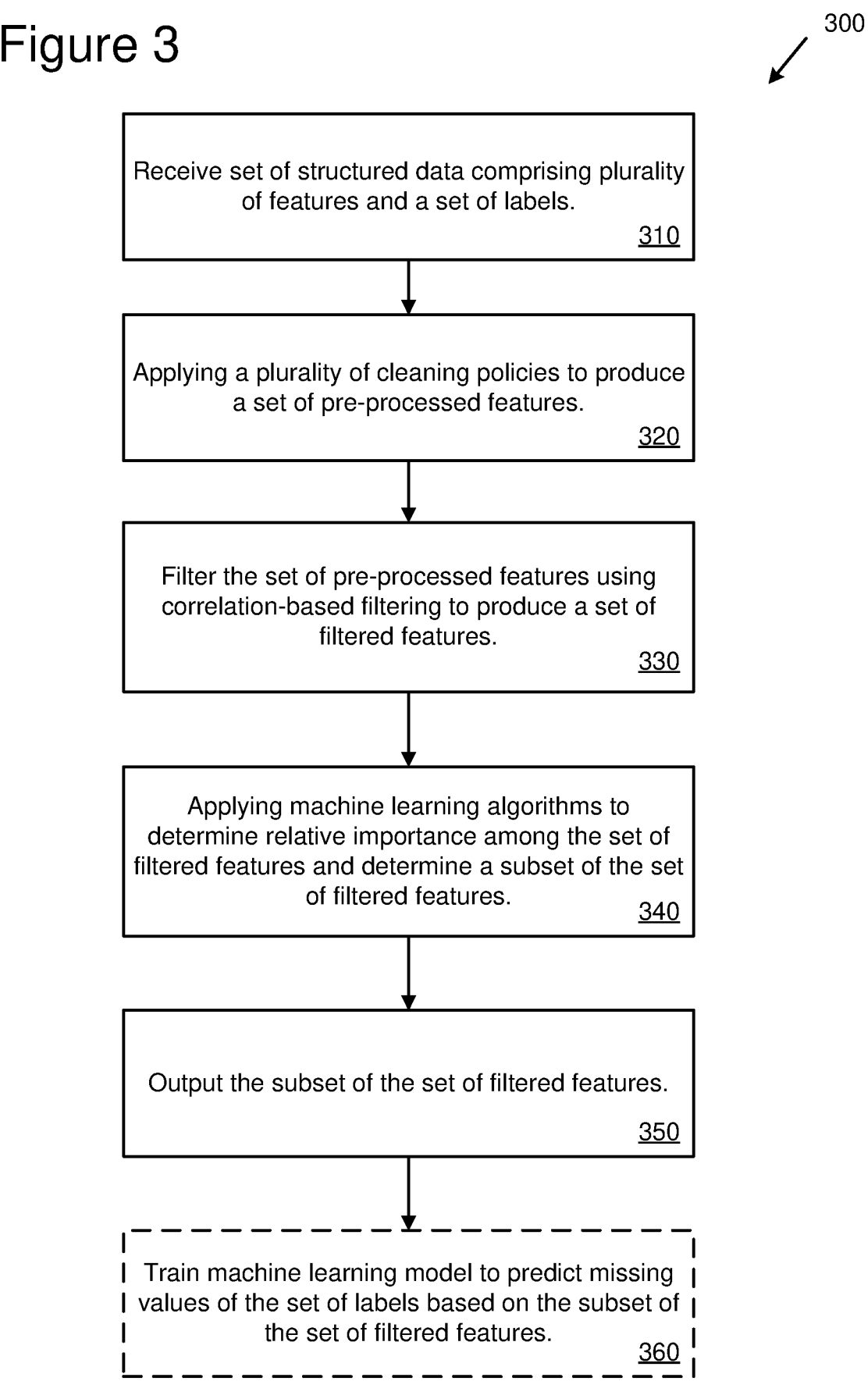
FIG. 3 is a is a flowchart of an example method for identifying features for predicting missing attribute values and using the identified features to train a machine learning model.

FIG. 3 is a flowchart depicting an example process 300 for identifying features for predicting missing attribute values. At 310, a set of structured data is received. The set of structured data comprises a plurality of features. The plurality of features can be identified by feature name, feature data type, feature value and/or other attributes. The set of structured data also comprises a set of labels. In this context (when providing a set of structured data for identifying features), the set of structured data includes the features and labels, and their associated values (e.g., as depicted in Table 1 and Table 2).

At 320, a plurality of cleaning policies is applied to at least the plurality of features to produce a set of pre-processed features. Different cleaning policies can be applied to different feature data types (e.g., a given cleaning policy can be specific to one or more feature data types).

At 330, the set of pre-processed features are filtered using correlation-based filtering. The correlation-based filtering applies one or more correlation estimation techniques to the set of pre-processed features to remove at least some highly correlated features. The correlation-based filtering produces a set of filtered features (which does not contain the highly correlated features that have been removed).

At 340, one or more machine learning algorithms are applied to determine relative importance among the set of filtered features and determine a subset of the set of filtered features. The relative importance is evaluated by determining relative importance values among the set of filtered features in relation to the set of labels. The subset of the set of filtered features is then selected based at least in part on the determined relative importance values (e.g., only retaining the top N features with the highest relative importance values).

At 350, the subset of the set of filtered features is output. The subset of the set of filtered features are the recommended features for predicting missing values of the set of labels. For example, the subset of the set of filtered features can be presented to a user (e.g., displayed in a computer user interface), saved to a file, or used as input to train a machine learning model to predict missing values of the set of labels.

Optionally, at 360, one or more machine learning models are trained to predict missing values of the set of labels based on the subset of the set of filtered features. For example, the machine learning models can be trained to make the prediction based only on the features in the subset of the set of filtered features (i.e., only the recommended features). In some implementations, the user can adjust the features that are used to train the machine learning models (e.g., by manually adding and/or removing features that will be used).

Computing Systems

Figure 4:
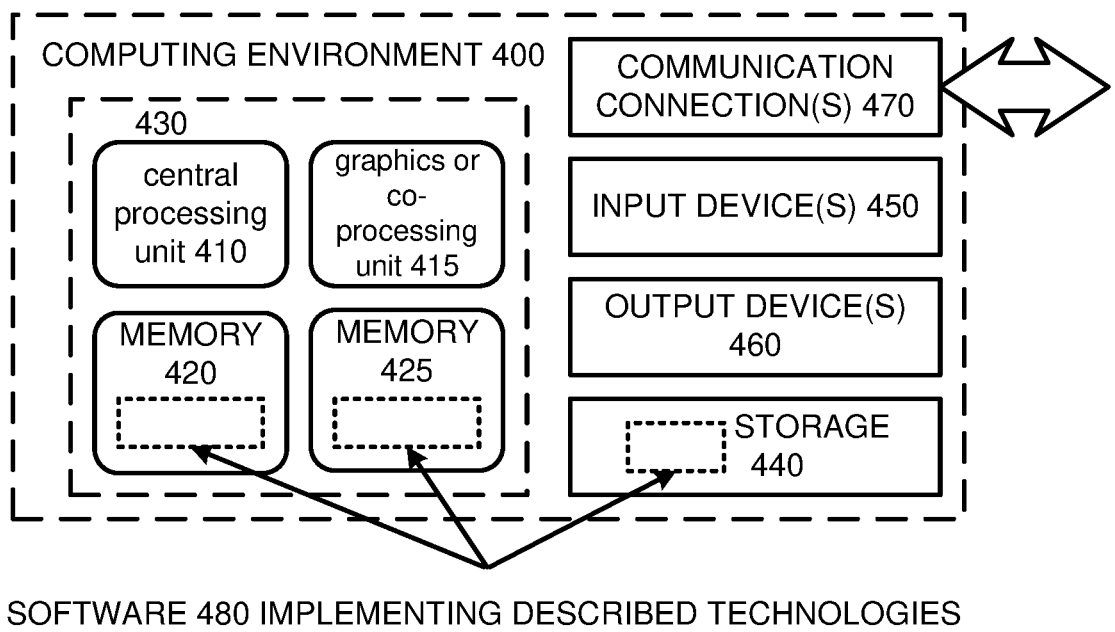
FIG. 4 is a diagram of an example computing system in which some described embodiments can be implemented.

FIG. 4 depicts a generalized example of a suitable computing system 400 in which the described innovations may be implemented. The computing system 400 is not intended to suggest any limitation as to scope of use or functionality, as the innovations may be implemented in diverse general-purpose or special-purpose computing systems.

With reference to FIG. 4, the computing system 400 includes one or more processing units 410, 415 and memory 420, 425. In FIG. 4, this basic configuration 430 is included within a dashed line. The processing units 410, 415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 4 shows a central processing unit 410 as well as a graphics processing unit or co-processing unit 415. The tangible memory 420, 425 may be volatile memory (e.g., registers, cache, RAM), non-volatile memory (e.g., ROM, EEPROM, flash memory, etc.), or some combination of the two, accessible by the processing unit(s). The memory 420, 425 stores software 480 implementing one or more innovations described herein, in the form of computer-executable instructions suitable for execution by the processing unit(s).

A computing system may have additional features. For example, the computing system 400 includes storage 440, one or more input devices 450, one or more output devices 460, and one or more communication connections 470. An interconnection mechanism (not shown) such as a bus, controller, or network interconnects the components of the computing system 400. Typically, operating system software (not shown) provides an operating environment for other software executing in the computing system 400, and coordinates activities of the components of the computing system 400.

The tangible storage 440 may be removable or non-removable, and includes magnetic disks, magnetic tapes or cassettes, CD-ROMs, DVDs, or any other medium which can be used to store information in a non-transitory way and which can be accessed within the computing system 400. The storage 440 stores instructions for the software 480 implementing one or more innovations described herein.

The input device(s) 450 may be a touch input device such as a keyboard, mouse, pen, or trackball, a voice input device, a scanning device, or another device that provides input to the computing system 400. For video encoding, the input device(s) 450 may be a camera, video card, TV tuner card, or similar device that accepts video input in analog or digital form, or a CD-ROM or CD-RW that reads video samples into the computing system 400. The output device(s) 460 may be a display, printer, speaker, CD-writer, or another device that provides output from the computing system 400.

The communication connection(s) 470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 5:
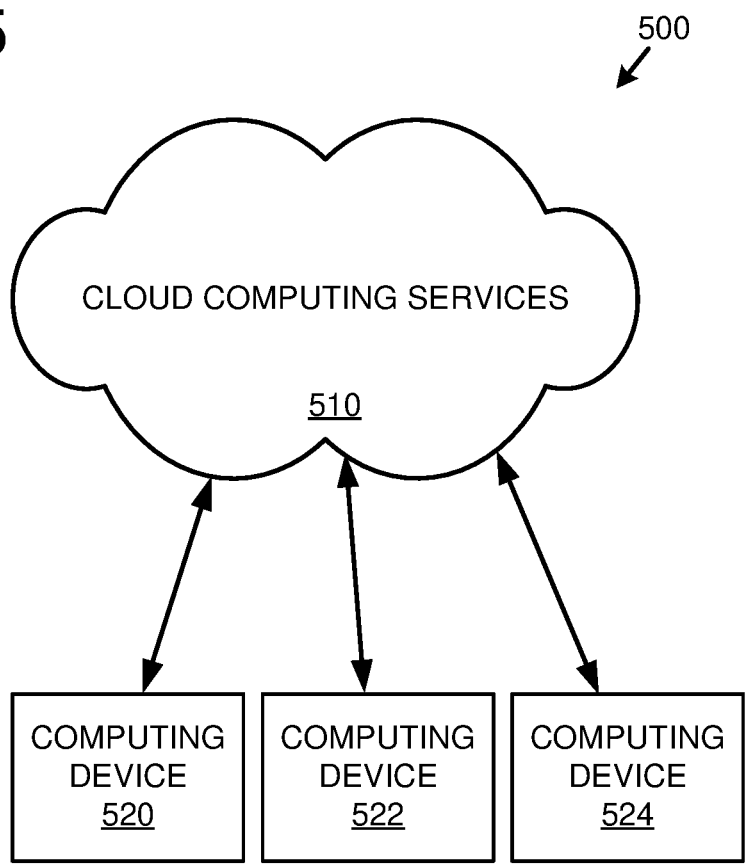
FIG. 5 is an example cloud computing environment that can be used in conjunction with the technologies described herein.

FIG. 5 depicts an example cloud computing environment 500 in which the described technologies can be implemented. The cloud computing environment 500 comprises cloud computing services 510. The cloud computing services 510 can comprise various types of cloud computing resources, such as computer servers, data storage repositories, database resources, networking resources, etc. The cloud computing services 510 can be centrally located (e.g., provided by a data center of a business or organization) or distributed (e.g., provided by various computing resources located at different locations, such as different data centers and/or located in different cities or countries).

The cloud computing services 510 are utilized by various types of computing devices (e.g., client computing devices), such as computing devices 520, 522, and 524. For example, the computing devices (e.g., 520, 522, and 524) can be computers (e.g., desktop or laptop computers), mobile devices (e.g., tablet computers or smart phones), or other types of computing devices. For example, the computing devices (e.g., 520, 522, and 524) can utilize the cloud computing services 510 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 4, computer-readable storage media include memory 420 and 425, and storage 440. The term computer-readable storage media does not include signals and carrier waves. In addition, the term computer-readable storage media does not include communication connections, such as 470.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automatically identifying features for training a machine learning model to predict missing attribute values, the method comprising:

receiving a set of structured data contained in a database table, the structured data comprising a plurality of features, which are identified by at least feature name, feature data type, and feature value; and one or more labels;

pre-processing the set of structured data comprising applying a plurality of cleaning policies, wherein different cleaning policies, of the plurality of cleaning policies, are applied to different feature data types, and wherein the pre-processing produces a set of pre-processed features;

filtering the set of pre-processed features using correlation-based filtering, wherein the correlation-based filtering applies one or more correlation estimation techniques to the set of pre-processed features to remove at least some highly correlated features and produce a set of filtered features;

performing feature subset selection comprising applying one or more supervised machine learning algorithms to the set of filtered features to determine relative importance values among the set of filtered features in relation to the one or more labels, wherein a subset of the set of filtered features is selected based at least in part on the determined relative importance values;

outputting the subset of the set of filtered features; and training a machine learning model to predict missing attribute values of the one or more labels based on the subset of the set of filtered features, wherein the correlation-based filtering comprises:

categorizing the plurality of features into multiple feature type groupings based on the feature data type, wherein the multiple feature type groupings comprise a first feature type grouping, a second feature type grouping, and a third feature type grouping, wherein the first feature type grouping contains features having a textural feature data type and a categorical feature data type, wherein the second feature type grouping contains features having a numerical feature data type, wherein the third feature type grouping contains features having a time or date feature data type;

for each feature type grouping, iteratively calculating pairwise correlation measures between pairs of features within the feature type grouping;

for each pair of highly correlated features within each feature type grouping:

determining which feature, of the pair of features, has more populated feature values existing in a column of the database table corresponding to the feature;

retaining the feature that has more populated feature values; and filtering out the other feature of the pair of features.

2. The method of claim 1, wherein one or more of the plurality of cleaning policies are data type specific cleaning policies, wherein a data type specific cleaning policy is specific to a particular feature data type.

3. The method of claim 1, wherein a first cleaning policy, of the plurality of cleaning policies, is applied to features having the textural feature data type, and a second cleaning policy, of the plurality of cleaning policies, is applied to features having the numerical feature data type.

4. The method of claim 1, wherein the correlation-based filtering comprises based on the correlation measures, determining which pairs of features are highly correlated, wherein determining which pairs of features are highly correlated comprises comparing the pairwise correlation measures to a threshold value.

5. The method of claim 1, wherein the first feature type grouping further contains features having a Boolean feature data type.

6. The method of claim 1, wherein performing feature subset selection further comprises:

retaining features, of the set of filtered features, that have relative importance values above a threshold value; and filtering out features, of the set of features, that have relative importance values at or below the threshold value.

7. The method of claim 1, wherein the machine learning model that is trained to predict missing attribute values is more computationally expensive than the one or more supervised machine learning algorithms used to perform the feature subset selection.

8. The method of claim 1, wherein iteratively calculating pairwise correlation measures between pairs of features within the feature type grouping is continued until all pairs of features within the feature type grouping have been compared.

9. The method of claim 1, wherein iteratively calculating pairwise correlation measures between pairs of features within the feature type grouping is limited to a random subset of features within the feature type grouping.

10. The method of claim 1, wherein performing feature subset selection further comprises:

ordering the set of filtered features according to the determined relative importance values; and retaining N features, of the set of filtered features, that have the highest relative importance values, wherein N is a predefined number.

11. One or more computing devices comprising:
one or more processors; and
memory;
the one or more computing devices configured, via computer-executable instructions, to perform operations for automatically identifying features for training a machine learning model to predict missing attribute values, the operations comprising:

receiving a set of structured data contained in a database table, the structured data comprising a plurality of features, which are identified by at least feature name, feature data type, and feature value; and one or more labels;

pre-processing the set of structured data comprising applying a plurality of cleaning policies, wherein different cleaning policies, of the plurality of cleaning policies, are applied to different feature data types, and wherein the pre-processing produces a set of pre-processed features;

filtering the set of pre-processed features using correlation-based filtering, wherein the correlation-based filtering applies one or more correlation estimation techniques to the set of pre-processed features to remove at least some highly correlated features and produce a set of filtered features;

performing feature subset selection comprising applying one or more supervised machine learning algorithms to the set of filtered features to determine relative importance values among the set of filtered features in relation to the one or more labels, wherein a subset of the set of filtered features is selected based at least in part on the determined relative importance values;

outputting the subset of the set of filtered features; and training a machine learning model to predict missing attribute values of the one or more label based on the subset of the set of filtered features, wherein the correlation-based filtering comprises:

categorizing the plurality of features into multiple feature type groupings based on the feature data type, wherein the multiple feature type groupings comprise a first feature type grouping, a second feature type grouping, and a third feature type grouping, wherein the first feature type grouping contains features having a textural feature data type and a categorical feature data type, wherein the second feature type grouping contains features having a numerical feature data type, wherein the third feature type grouping contains features having a time or date feature data type;

for each feature type grouping, iteratively calculating pairwise correlation measures between pairs of features within the feature type grouping until all permutations of pairs of features within the feature type grouping have been compared;

for each pair of highly correlated features within each feature type grouping:

determining which feature, of the pair of features, has more populated feature values existing in a column of the database table corresponding to the feature;

retaining the feature that has more populated feature values; and filtering out the other feature of the pair of features.

12. The one or more computing devices of claim 11, wherein a first cleaning policy, of the plurality of cleaning policies, is applied to features having the textural feature data type, and a second cleaning policy, of the plurality of cleaning policies, is applied to features having the numerical feature data type.

13. The one or more computing devices of claim 11, wherein the correlation-based filtering comprises:

retaining features that are relatively uncorrelated in the set of filtered features; and filtering out at least some features that are highly correlated in the set of filtered features.

14. The one or more computing devices of claim 11, wherein the correlation-based filtering comprises:

calculating pairwise correlation measures between pairs of features of the set of pre-processed features;

based on the correlation measures, determining which pairs of features are highly correlated, wherein determining which pairs of features are highly correlated comprises comparing the pairwise correlation measures to a threshold value; and filtering out at least some features of the pairs of features that are highly correlated.

15. The one or more computing devices of claim 11, wherein performing feature subset selection further comprises:

retaining features, of the set of filtered features, that have relative importance values above a threshold value; and filtering out features, of the set of features, that have relative importance values at or below the threshold value.

16. One or more computer-readable storage media storing computer-executable instructions for execution on one or more computing devices to perform operations for automatically identifying features for a machine learning model to predict missing attribute values, the operations comprising:

receiving a set of structured data contained in a database table, the structured data comprising:
 a plurality of features which are identified by at least feature name, feature data type, and feature value; and
 a set of labels;

applying a plurality of cleaning policies to the plurality of features, wherein different cleaning policies, of the plurality of cleaning policies, are applied to different feature data types, and wherein the pre-processing produces a set of pre-processed features;

filtering the set of pre-processed features using correlation-based filtering, wherein the correlation-based filtering applies one or more correlation estimation techniques to the set of pre-processed features to remove at least some highly correlated features and produce a set of filtered features;

applying one or more supervised machine learning algorithms to the set of filtered features to determine relative importance values among the set of filtered features in relation to the set labels, wherein a subset of the set of filtered features is selected based at least in part on the determined relative importance values;

outputting the subset of the set of filtered features; and training a machine learning model to predict missing attribute values of the set of labels based on the subset of the set of filtered features, wherein the correlation-based filtering comprises:

categorizing the plurality of features into multiple feature type groupings based on the feature data type, wherein the multiple feature type groupings comprise a first feature type grouping, a second feature type grouping, and a third feature type grouping, wherein the first feature type grouping contains features having a textural feature data type and a categorical feature data type, wherein the second feature type grouping contains features having a numerical feature data type, wherein the third feature type grouping contains features having a time or date feature data type;

for each feature type grouping, iteratively calculating pairwise correlation measures between pairs of features within the feature type grouping until all permutations of pairs of features within the feature type grouping have been compared;

for each pair of highly correlated features within each feature type grouping:
 determining which feature, of the pair of features, has more populated feature values existing in a column of the database table corresponding to the feature;
 retaining the feature that has more populated feature values; and
 filtering out the other feature of the pair of features.

17. The one or more computer-readable storage media of claim 16, wherein a first cleaning policy, of the plurality of cleaning policies, is applied to features having the textural feature data type, and a second cleaning policy, of the plurality of cleaning policies, is applied to features having the numerical feature data type.

18. The one or more computer-readable storage media of claim 16, wherein the correlation-based filtering comprises:

based on the correlation measures, determining which pairs of features are highly correlated, wherein determining which pairs of features are highly correlated comprises comparing the pairwise correlation measures to a threshold value; and filtering out at least some features of the pairs of features that are highly correlated.

19. The one or more computer-readable storage media of claim 16, wherein performing feature subset selection further comprises:

retaining features, of the set of filtered features, that have relative importance values above a threshold value; and filtering out features, of the set of features, that have relative importance values at or below the threshold value.

20. The one or more computer-readable storage media of claim 16, the operations further comprising:

outputting the trained machine learning model.

* * * * *